US007856224B2

(12) United States Patent
Petchenev et al.

(10) Patent No.: US 7,856,224 B2
(45) Date of Patent: Dec. 21, 2010

(54) SYSTEMS AND METHODS FOR RECOVERING A SIGNAL OF INTEREST FROM A COMPLEX SIGNAL

(75) Inventors: Alexei Petchenev, Minden, NV (US); Olga Malakhova, Carson City, NV (US)

(73) Assignee: General Electric Company, Schenectady, NY (US)

( * ) Notice: Subject to any disclaimer, the term of this patent is extended or adjusted under 35 U.S.C. 154(b) by 890 days.

(21) Appl. No.: 11/095,258

(22) Filed: Mar. 31, 2005

(65) Prior Publication Data
US 2006/0229047 A1  Oct. 12, 2006

(51) Int. Cl.
H04B 1/16 (2006.01)
G01R 23/00 (2006.01)

(52) U.S. Cl. ............... 455/336; 455/227; 455/337; 702/75; 702/189; 324/76.39; 324/520; 331/44

(58) Field of Classification Search ............... 455/334, 455/336, 337; 702/75, 76, 189, 190, 191; 331/18, 19, 44, 64; 324/76.39, 520
See application file for complete search history.

(56) References Cited

U.S. PATENT DOCUMENTS

| | | | | |
|---|---|---|---|---|
| 3,609,575 A | * | 9/1971 | Parzen et al. ............ 331/2 |
| 4,354,277 A | * | 10/1982 | Crackel et al. ............ 455/259 |
| 4,376,268 A | * | 3/1983 | Moriya et al. ............ 331/10 |
| 4,630,054 A | * | 12/1986 | Martinson ............ 342/20 |
| 4,961,074 A | * | 10/1990 | Martinson ............ 342/20 |
| 5,122,731 A | * | 6/1992 | Cole ............ 324/76.26 |
| 5,365,787 A | * | 11/1994 | Hernandez et al. ............ 73/660 |
| 5,612,978 A | | 3/1997 | Blanchard et al. |
| 5,751,899 A | * | 5/1998 | Large et al. ............ 704/207 |
| 6,020,782 A | * | 2/2000 | Albert et al. ............ 327/552 |
| 6,091,236 A | * | 7/2000 | Piety et al. ............ 324/103 P |
| 6,131,013 A | | 10/2000 | Bergstrom et al. |
| 6,249,179 B1 | * | 6/2001 | Maalej et al. ............ 329/304 |
| 6,259,326 B1 | * | 7/2001 | Dunlop et al. ............ 331/2 |
| 6,285,249 B1 | * | 9/2001 | Bulsara et al. ............ 327/551 |
| 6,504,278 B1 | * | 1/2003 | Bald et al. ............ 310/81 |
| 7,061,330 B2 | * | 6/2006 | Kegasa et al. ............ 331/11 |
| 7,064,556 B2 | * | 6/2006 | Petchenev et al. ............ 324/613 |
| 7,065,474 B2 | * | 6/2006 | Petchenev et al. ............ 702/190 |
| 7,102,379 B2 | * | 9/2006 | Hobelsberger et al. ............ 324/772 |
| 7,376,562 B2 | * | 5/2008 | Large ............ 704/236 |
| 7,693,212 B2 | * | 4/2010 | Petchenev et al. ............ 375/219 |
| 2005/0187752 A1 | * | 8/2005 | Colby et al. ............ 703/19 |
| 2005/0200378 A1 | * | 9/2005 | Hobelsberger et al. ............ 324/772 |
| 2005/0250465 A1 | * | 11/2005 | Gibbs ............ 455/260 |
| 2005/0256656 A1 | | 11/2005 | Petchenev et al. |

OTHER PUBLICATIONS

U.S. Appl. No. 60/568,104, filed May 4, 2004.*

* cited by examiner

Primary Examiner—Duc M Nguyen
(74) Attorney, Agent, or Firm—Armstrong Teasdale LLP

(57) ABSTRACT

A system for recovering a signal of interest from a complex signal is provided. The system includes a plurality of different oscillators. Each of the plurality of oscillators is configured to facilitate improving a signal-to-noise ratio of an input complex signal by adjusting an oscillation frequency of each of the plurality of oscillators based on an input frequency of interest of the input complex signal.

17 Claims, 15 Drawing Sheets

SYSTEMS AND METHODS FOR RECOVERING A SIGNAL OF INTEREST FROM A COMPLEX SIGNAL

CROSS REFERENCE TO RELATED APPLICATIONS

This application is related to U.S. patent application having Ser. No. 10/846,183, titled "Frequency Rectification System: Apparatus and Method", and filed on May 14, 2004.

BACKGROUND OF THE INVENTION

This invention relates generally to systems and methods for distinguishing a frequency of interest from noise and more particularly to systems and methods for recovering a signal of interest from a complex signal.

Electric machines, such as motors, are used for a wide variety of applications including but not limited to closing or opening electric switches, and/or providing power to electrical appliances. Knowing the frequency of interest with which such electrical machines operate facilitates accurately determining whether a machine is malfunctioning. However, because of surrounding noise, it may be difficult to determine the frequency of interest. Moreover, in some instances, the frequency of interest cannot be easily separated from the noise when the frequency of interest is indistinguishable from the noise.

To facilitate determining the frequency of interest of a machine, at least some applications use a filter to narrow a range of frequencies of operation of the machine to a band of frequencies that includes the frequency of interest. After the operations frequency range is narrowed, the frequency of interest may then be detected from within the frequency band. However, when the signal of interest is indistinguishable from the noise, all spectrum peaks may represent frequencies of the noise rather than the frequency of interest. Selecting one of the spectrum peaks may produce random results, rather than the frequency of interest. Thus, it is difficult to distinguish the frequency of interest from within the frequency band.

BRIEF DESCRIPTION OF THE INVENTION

In one aspect, a system for recovering a signal of interest from a complex signal is provided. The system includes at least one oscillator. The at least one oscillator is configured to facilitate improving a signal-to-noise ratio of an input complex signal by adjusting an oscillation frequency of the at least one oscillator based on an input frequency of interest of the input complex signal.

In another aspect, a system for recovering a signal of interest from a complex signal is provided. The system includes a signal transducer configured to convert a machine output signal having a first form to generate an analog sensed signal, an analog-to-digital converter configured to convert the analog sensed signal to an input complex signal, and at least one oscillator. At least one oscillator is configured to facilitate improving a signal-to-noise ratio of an input complex signal by adjusting an oscillation frequency of the at least one oscillator based on an input frequency of interest of the input complex signal.

In a further aspect, a method for recovering a signal of interest from a complex signal is provided. The method includes receiving an input complex signal, and improving, by each of at least one oscillator, a signal-to-noise ratio of the input complex signal, wherein improving the signal-to-noise ratio is performed by adjusting an oscillation frequency of the oscillator based on an input frequency of interest of the input complex signal.

DETAILED DESCRIPTION OF THE INVENTION

Figure 1:
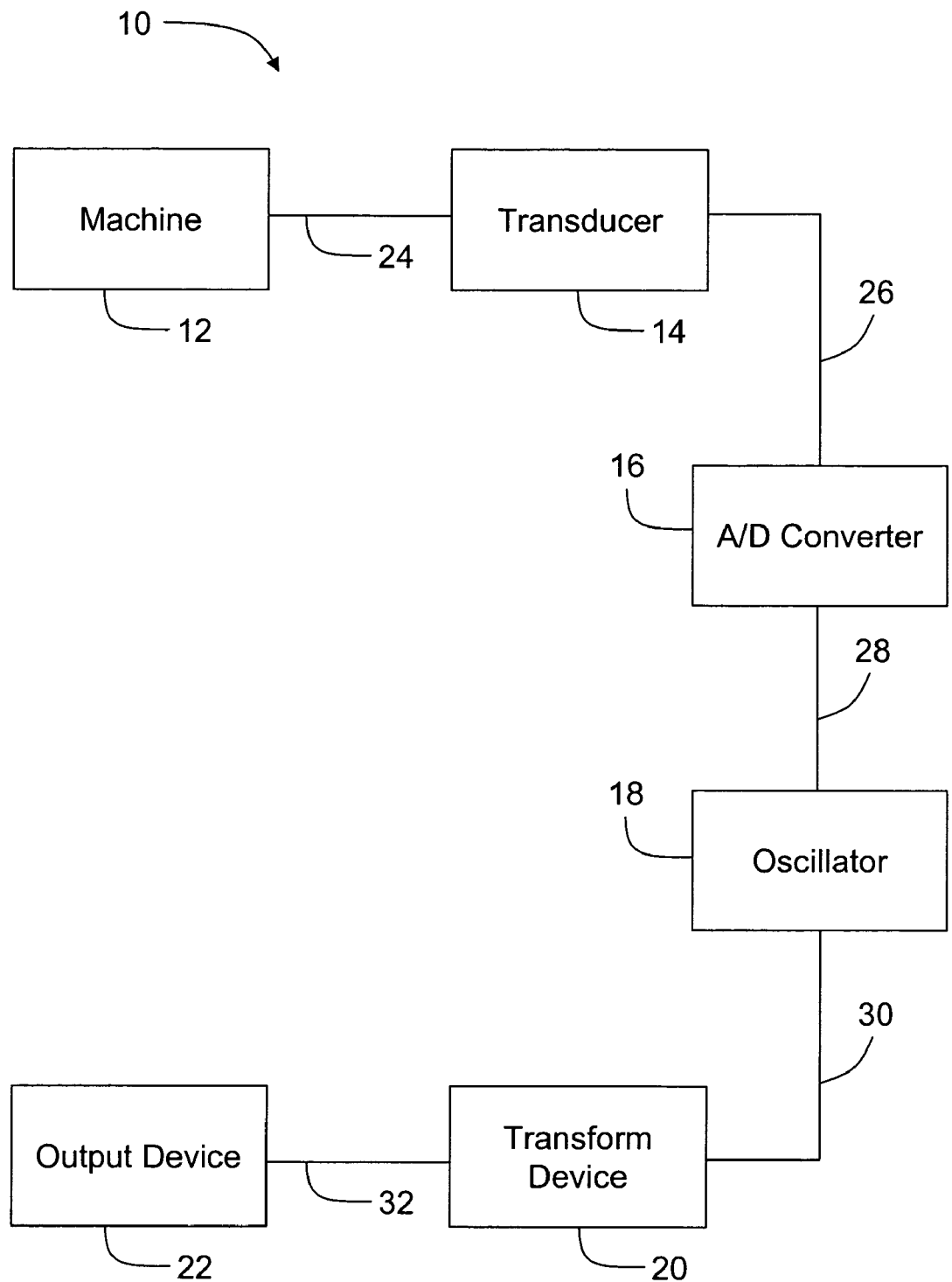
FIG. 1 is an exemplary embodiment of a system that may be used to recover a signal of interest from a complex signal.

FIG. 1 is an exemplary embodiment of a system 10 for recovering a signal of interest from a complex signal. System 10 includes a machine 12, a transducer 14, an analog-to-digital (A/D) converter 16, an oscillator 18, a transform device 20, and an output device 22. In an alternative embodiment, oscillator 18 includes transform device 20 and output device 22. In another embodiment, system 10 includes a plurality of oscillators 18. Machine 12 may represent but is not limited to being a rotor shaft of an electric motor and/or a casing of a turbine. Transducer 14 may represent but is not limited to an electromagnetic sensor that senses a change in electromagnetic signals. Such signal changes are generated by an oscillation, such as a rotation, of machine 12.

Oscillator 18 may include a voltage-controlled oscillator (VCO), a rotator, or alternatively any other component that adjusts an oscillation frequency of oscillator 18 to be approximately equal an input frequency of interest of an input complex signal provided to the oscillator. In an alternative embodiment, oscillator 18 is not a Van der Pol oscillator. Transform device 20 may represent a Fourier transform device that converts a signal from a time domain to a frequency domain. For example, in one embodiment, the Fourier transform device is a Fast Fourier transform device. Output device 22 may include a display, such as a cathode ray tube.

Transducer 14 generates a field, such as an electromagnetic field, around machine 12. Machine 12 oscillates, such as, rotates, within the electric magnetic field and changes the field to generate a machine output signal 24. Transducer 14 senses machine output signal 24 and converts signal 24 into an analog sensed signal 26 that has a form suitable for reception by A/D converter 16. For example, in the exemplary embodiment, transducer 14 receives an electromagnetic signal output from machine 12 and converts the electromagnetic signal into an electrical signal. A/D converter 16 receives analog sensed signal 26 and converts signal 26 from an analog form to a digital form. A/D converter 16 outputs an input complex signal 28 that includes an input signal of interest and an input noise signal, such as white noise. The input signal of interest has an input frequency of interest, which may be indistinguishable from the input noise signal and may be constant. An example of the input frequency of interest is a natural frequency of oscillation of machine 12. The natural frequency may be displayed on a label on machine 12.

Oscillator 18 receives input complex signal 28 and adjusts a plurality of operating parameters of oscillator 18 to be approximately equal the oscillation frequency with the input frequency of interest of signal 28. Alternatively, upon receipt of input complex signal 28, oscillator 18 adjusts a single operating parameter, such as the oscillation frequency, of oscillator 18 to be approximately equal the oscillation frequency of input frequency of interest of signal 28. Oscillator 18 continues to adjust operating parameters until the oscillation frequency is approximately equal to an input frequency of interest of signal 28.

Over time, oscillator 18 synchronizes the oscillation frequency with an input frequency of interest of input complex signal 28. Moreover, the impact of the input noise signal on the oscillation frequency lessens and self-eliminates over time. More specifically, the input noise signal changes the oscillation frequency in a positive direction for some time and in a negative direction for the remaining time. Oscillator 18 outputs an output complex signal 30 having an output signal of interest and an output noise signal. Signal 30 has a higher signal-to-noise ratio than input complex signal 28 and as such, the output signal of interest is distinguishable from the output noise signal. Moreover, the output signal of interest has an output frequency of interest, which represents the oscillation frequency.

Transform device 20 receives output complex signal 30 and transforms signal 30 from the time domain to the frequency domain. In one embodiment, transform device 20 applies a Fourier transform or alternatively a Fast Fourier transform to transform output complex signal 30 from the time domain to the frequency domain. Transform device 20 outputs a frequency domain signal 32 to output device 22 which displays frequency domain signal 32.

An operator views output device 22 and determines whether machine 12 is oscillating properly, such as, within a pre-determined frequency range, or alternatively within a variance of a pre-determined frequency. When machine 12 is not oscillating properly, the operator takes measures, such as, calls a repair center, to improve the operation of machine 12. For example, machine 12 may be determined to be not oscillating properly when machine 12 oscillates with a frequency that is outside the pre-determined frequency range or alternatively is outside the variance.

Figure 2:
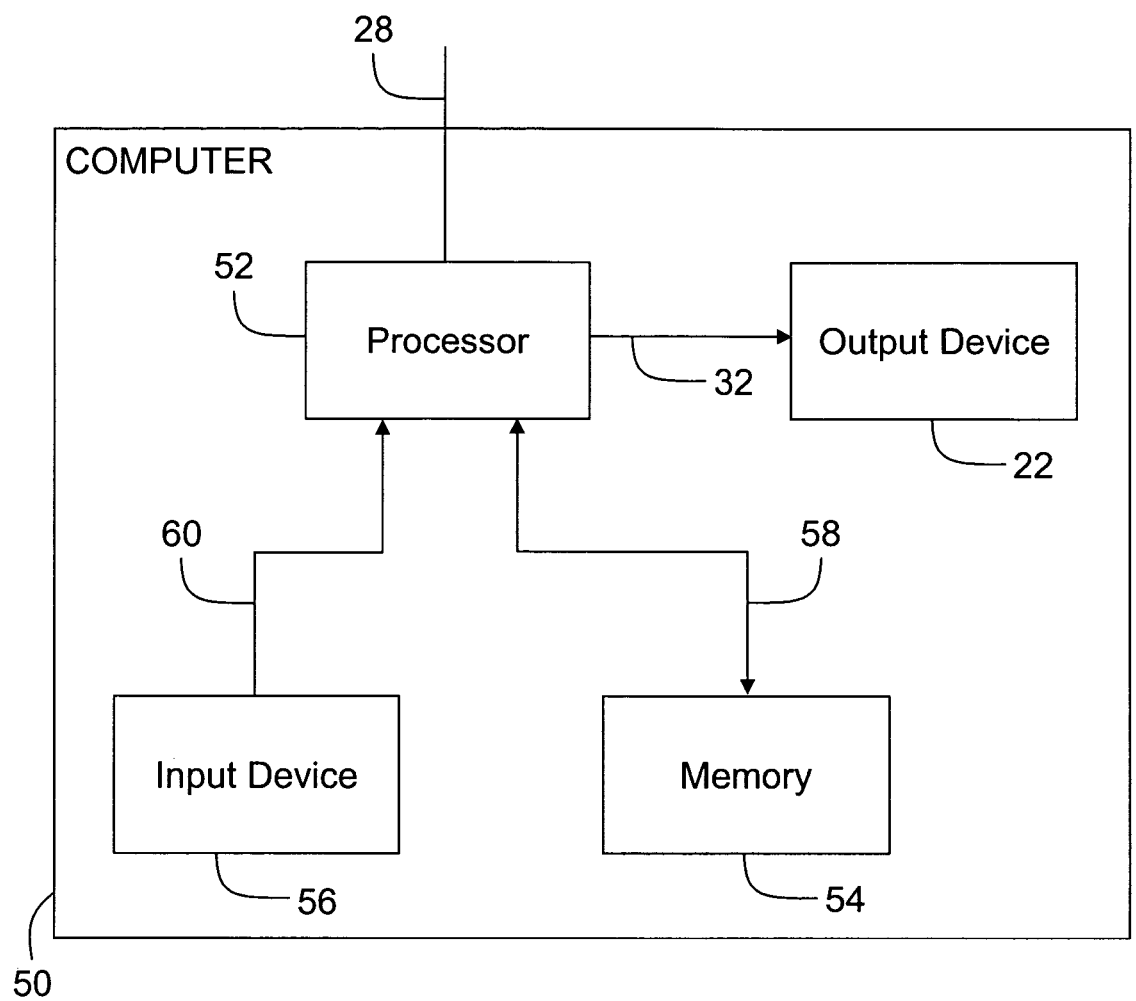
FIG. 2 is an exemplary embodiment of a computer which may be used with the system of FIG. 1.

FIG. 2 is an exemplary embodiment of a computer 50, which is an example of oscillator 18 and which may be used with system 10 of FIG. 1. Computer 50 includes a processor 52, a memory 54, an input device 56, and output device 22. As used herein, the term computer is not limited to just those integrated circuits referred to in the art as a computer, but broadly refers to a processor, a microcontroller, a microcomputer, a programmable logic controller, an application specific integrated circuit, and other programmable circuits, and these terms are used interchangeably herein. Memory 54 may include, but it not limited to, a computer-readable medium, such as a floppy disk, a random access memory, a compact disc—read only memory (CD-ROM), a magneto-optical disk (MOD), and/or a digital versatile disc (DVD). Input device 56 may represent, but is not limited to, a mouse, a keyboard, and/or a scanner.

Processor 52 receives input complex signal 28 from A/D converter 16 and processes the signal 28. Processor 52 processes signal 28 by adjusting a plurality of operating parameters to approximately equal the oscillation frequency with an input frequency of interest of signal 28. Processor 52 retrieves the operating parameters from memory 54 via a memory signal 58. The operator operates input device 56 to provide the operating parameters to processor 52 via an input signal 60. Optionally, the operator may adjust the processor operating parameters to approximately equal the oscillation frequency with the input frequency of interest of input complex signal 28. Processor 52 generates output complex signal 30 by processing input complex signal 28.

Processor 52 converts output complex signal 30 from the time domain to the frequency domain, and then outputs frequency domain signal 32. Processor 52 determines, based on frequency domain signal 32, whether the oscillation frequency approximately equals an input frequency of interest of signal 28. When the oscillation frequency is not approximately equal to the input frequency of signal 28, processor 52 re-adjusts the operating parameters to approximately equal the oscillation frequency with the input frequency of interest of signal 28.

Figure 3:
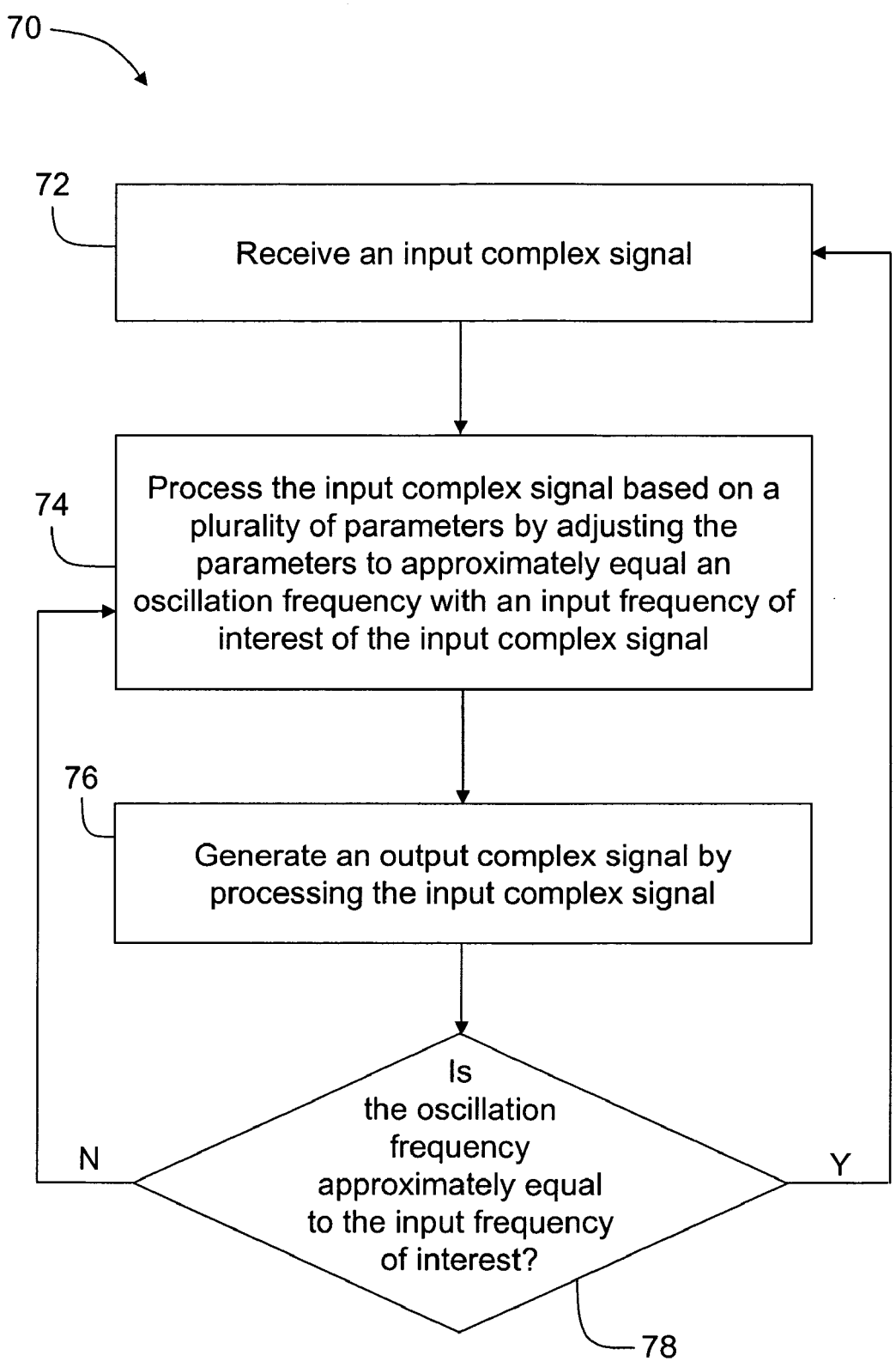
FIG. 3 is a flowchart of an exemplary method for recovering a signal of interest from a complex signal.

FIG. 3 is a flowchart illustrating an exemplary method 70 for recovering a signal of interest from a complex signal. Method 70 includes receiving 72 input complex signal. Method 70 also includes processing 74 an input complex signal by adjusting the processor operating parameters to approximately equal the oscillation frequency with an input frequency of interest of the input complex signal. Method 70 also includes generating 76, the output complex signal, by processing the input complex signal. In doing so, a determination 78 is made whether the oscillation frequency approximately equals an input frequency of interest of the input complex signal. The operating parameters of processor are then re-adjusted to be approximately equal the oscillation frequency with an input frequency of interest of the input complex signal when the determination 78 indicates that the oscillation frequency is not approximately equal to the input frequency of interest. The method 70 is repeated when another input complex signal 28 is received.

Figure 4:
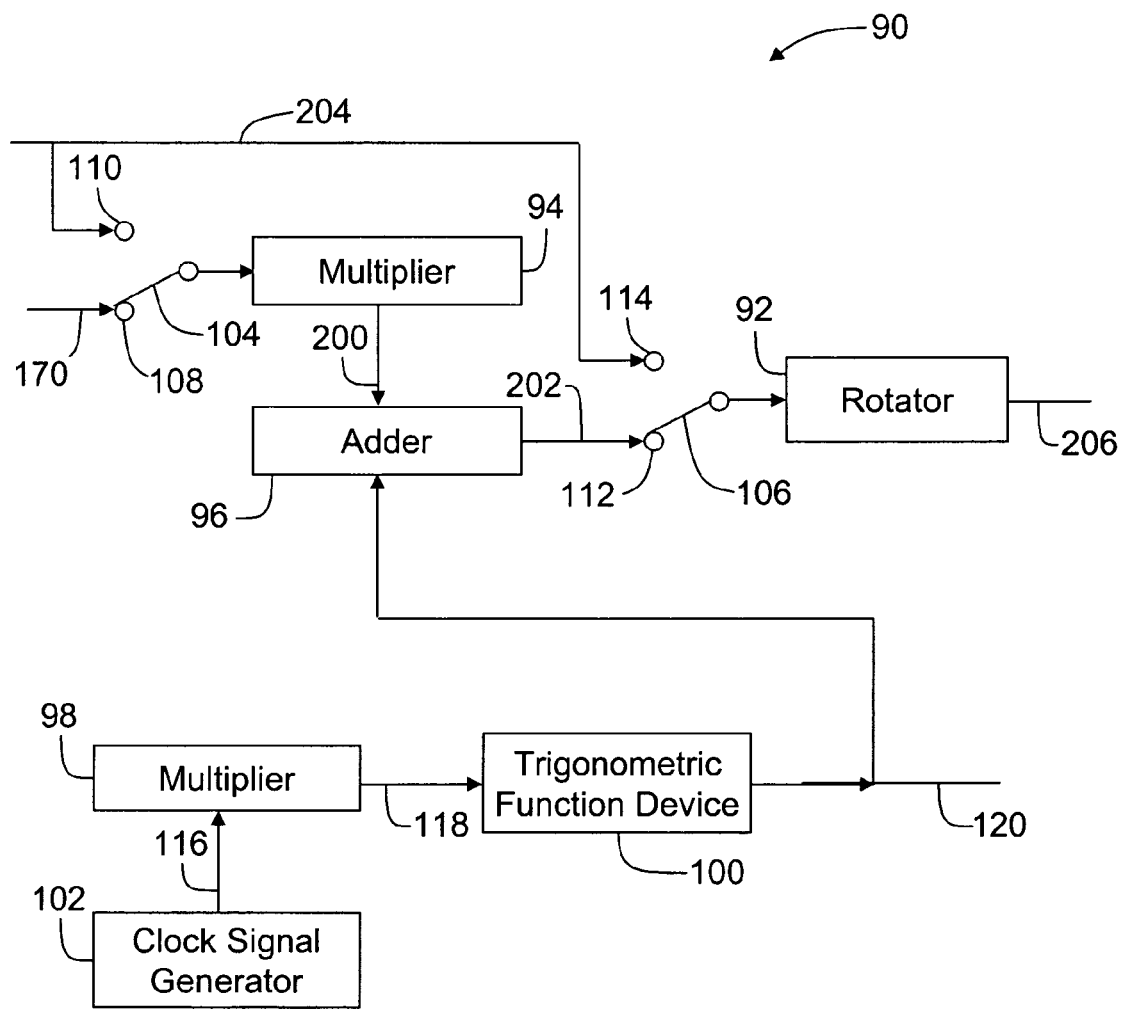
FIG. 4 is an alternative embodiment of a system that may be used to recover a signal of interest from a complex signal.
Figure 5:
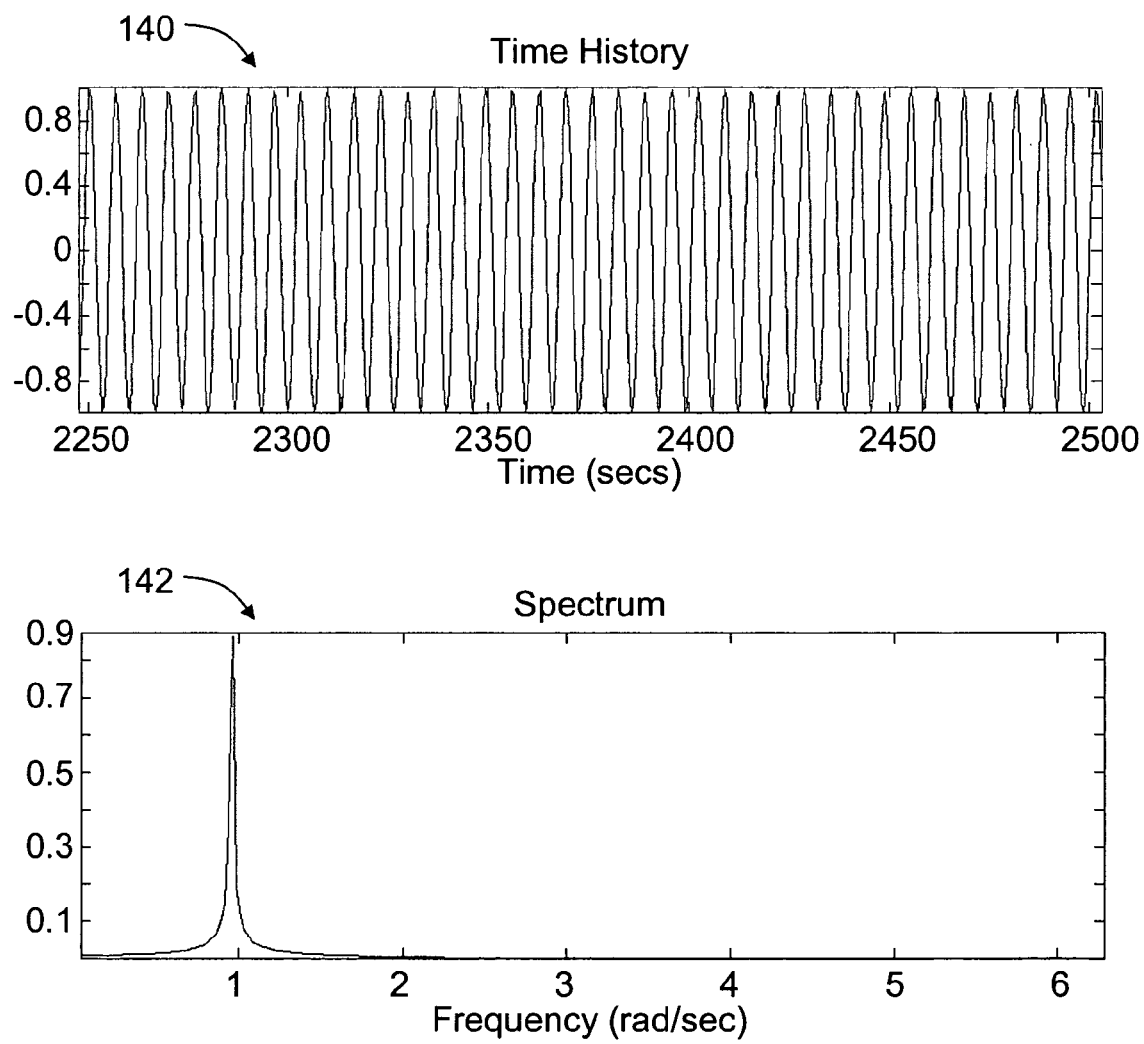
FIG. 5 is a graphical representation of an exemplary input signal provided to the system of FIGS. 1 and 4.
Figure 6:
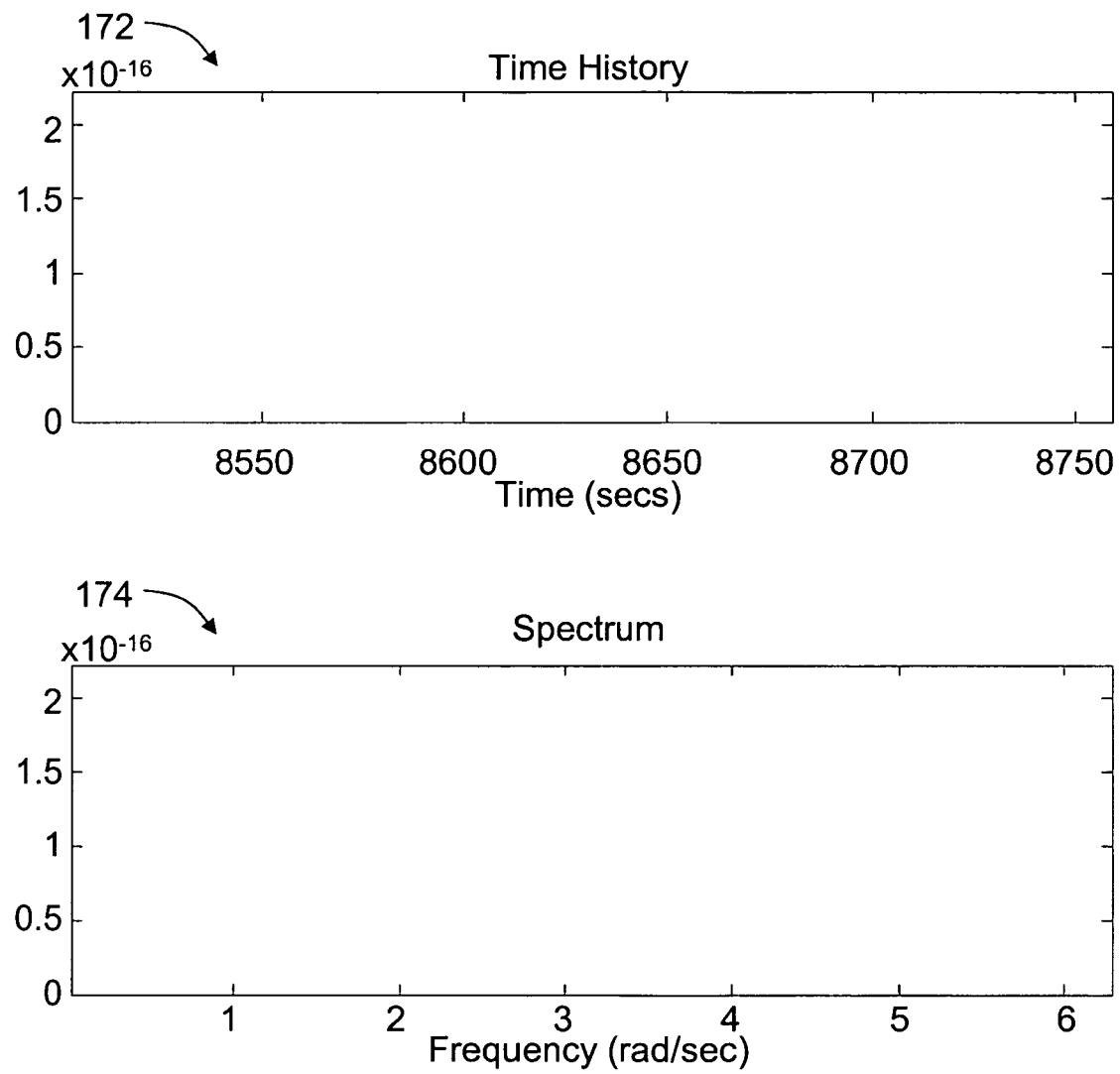
FIG. 6 is a graphical representation of an exemplary noise signal detected with the system of FIGS. 1 and 4.

FIG. 4 is an exemplary embodiment of a system 90 that may be used to recover a signal of interest from a complex signal. FIGS. 5-13 illustrate graphs representing exemplary signals that may be communicated within system 90. System 90 includes a rotator 92, which is an example of oscillator 18. System 90 further includes a first multiplier 94, an adder 96, a second multiplier 98, a trigonometric function device 100, a clock signal generator 102, a plurality of switches 104 and 106, and a plurality of terminals 108, 110, 112, and 114. Clock signal generator 102 may include a quartz crystal. Trigonometric function device 100 executes a trigonometric function, such as a sin function and a cosine function. Each of multipliers 94 and 98 may include an amplifier.

Clock signal generator 102 oscillates to generate a clock signal 116. Multiplier receives clock signal 116, determines a frequency of the clock signal, multiplies the frequency with a constant, such as, for example, 0.95, and outputs a multiplied clock signal 118. Trigonometric function device 100 receives multiplied clock signal 118 and performs the trigonometric function on signal 118 to generate an input clock signal of interest 120. An example of the input clock signal of interest 120 is displayed in graphs 140 and 142 of FIG. 5, graphs 150 and 152 of FIG. 8, and graphs 160 and 162 of FIG. 11.

Graph 140 illustrates an example of an exemplary input clock signal of interest 120 in the time domain and graph 142 illustrates an example of an exemplary signal of interest 120 in the frequency domain. Graph 150 displays an example of an exemplary input clock signal of interest 120 in the time domain and graph 152 shows an example of an exemplary signal of interest 120 in the frequency domain. Graph 160 shows an example of an exemplary input clock signal of interest 120 in the time domain and graph 162 shows an example of an exemplary signal of interest 120 in the frequency domain. In graphs 140, 150 and 160, the amplitudes of each input clock signal of interest 120 are plotted on the y-axis and time t, measured in seconds, is plotted on the x-axis. In graphs 142, 152 and 162, the amplitudes of each input clock signal of interest 120 are plotted on the y-axis and the frequency of signal of interest 120, measured in radians/second, are plotted on the x-axis. In each of graphs 140, 150, and 160, each input clock signal of interest 120 has an amplitude of 1, a frequency of approximately 0.95 radians/second, and is a sinusoidal signal.

Referring again to FIG. 4, multiplier 94 receives a rotation noise signal 170. Rotation noise signal 170 represents noise from which input clock signal of interest 120 is indistinguishable. An example of rotation noise signal 170 is shown in graphs 172 and 174 of FIG. 6, graphs 182 and 184 of FIG. 9, and graphs 192 and 194 of FIG. 12.

Graph 172 illustrates an example of an exemplary rotation noise signal 170 in the time domain and graph 174 illustrates an example of an exemplary signal 170 in the frequency domain. Graph 182 displays an example of an exemplary rotation noise signal 170 in the time domain and graph 184 shows an example of an exemplary signal 170 in the frequency domain. Graph 192 shows an example of an exemplary rotation noise signal 170 in the time domain and graph 194 shows an example of an exemplary signal 170 in the frequency domain. In graphs 172, 182, and 192, the amplitudes of rotation noise signal 170 are plotted on the y-axis and time t, measured in seconds, is plotted on the x-axis. In graphs 174, 184 and 194, amplitudes of each rotation noise signal 170 are plotted on the y-axis and frequencies of signal 170, measured in radians/second, are plotted on the x-axis. Referring again to FIG. 4, multiplier 94 multiplies rotation noise signal 170 with a factor to generate a multiplied rotation noise signal 200. As an example, multiplier 94 multiplies rotation noise signal 170 by amplifying signal 170. An example of the factor includes a constant, such as one, two, or three.

Adder 96 adds multiplied rotation noise signal 200 with input clock signal of interest 120 to generate an input complex rotation signal 202. Rotator receives 92 an input signal 204 having an amplitude of zero and/or does not receive input complex rotation signal 202. More specifically, rotator 92 receives input signal 204 when switch 106 is connected to terminal 114, and rotates to output an output complex rotation signal 206 including an output rotation noise signal and an output rotation signal of interest. Moreover, when input signal 204 is received, rotator 92 rotates with a rotation frequency, which is adjusted prior to receiving input signal 204. More specifically, the rotation frequency is adjusted to approximately equal an input frequency of interest of signal 120. Operating parameters of rotator 92 are adjusted to be approximately equal the rotation frequency of the input frequency of interest of signal 120.

Figure 7:
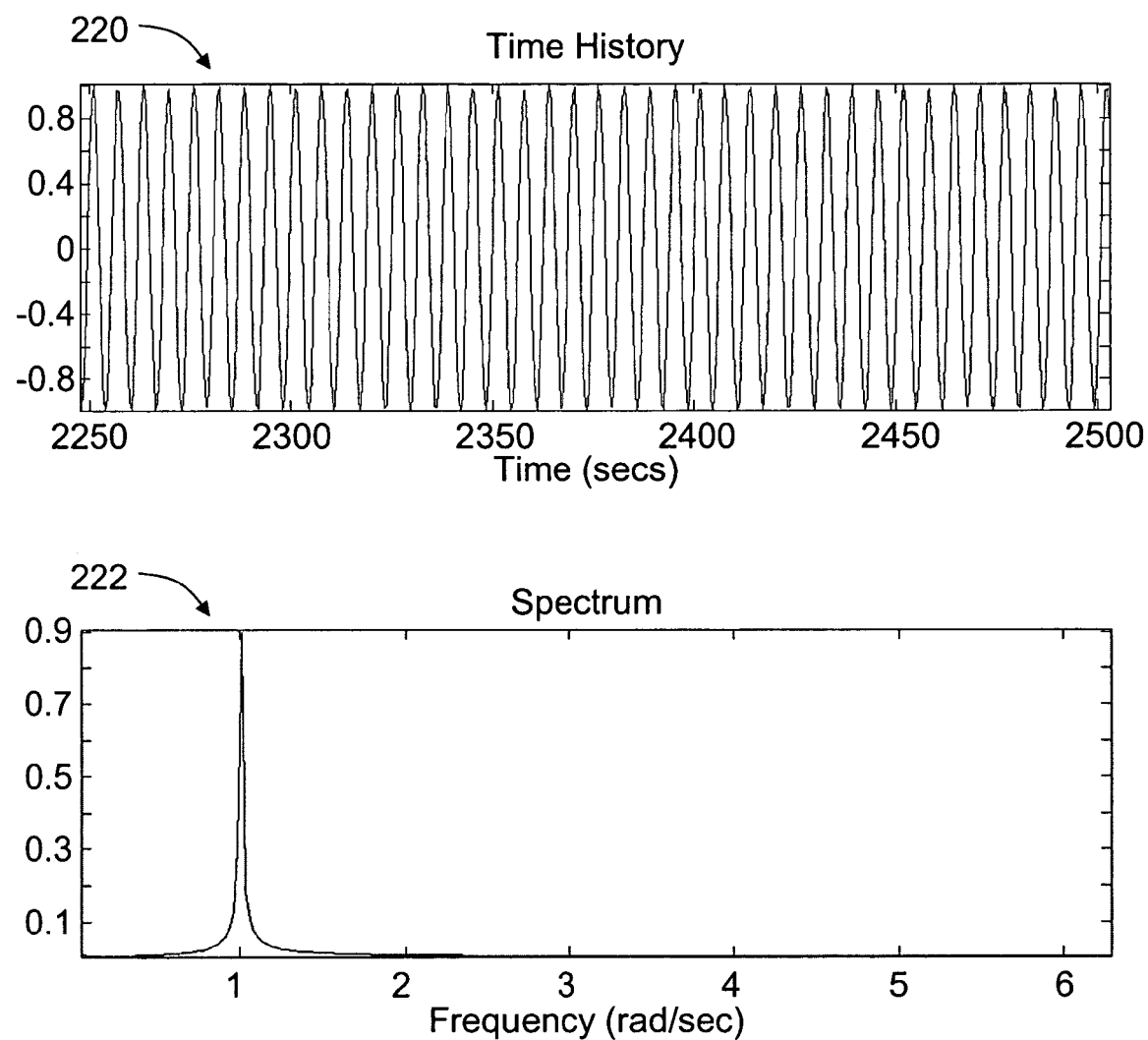
FIG. 7 is a graphical representation of an exemplary output signal used with the system of FIGS. 1 and 4.
Figure 8:
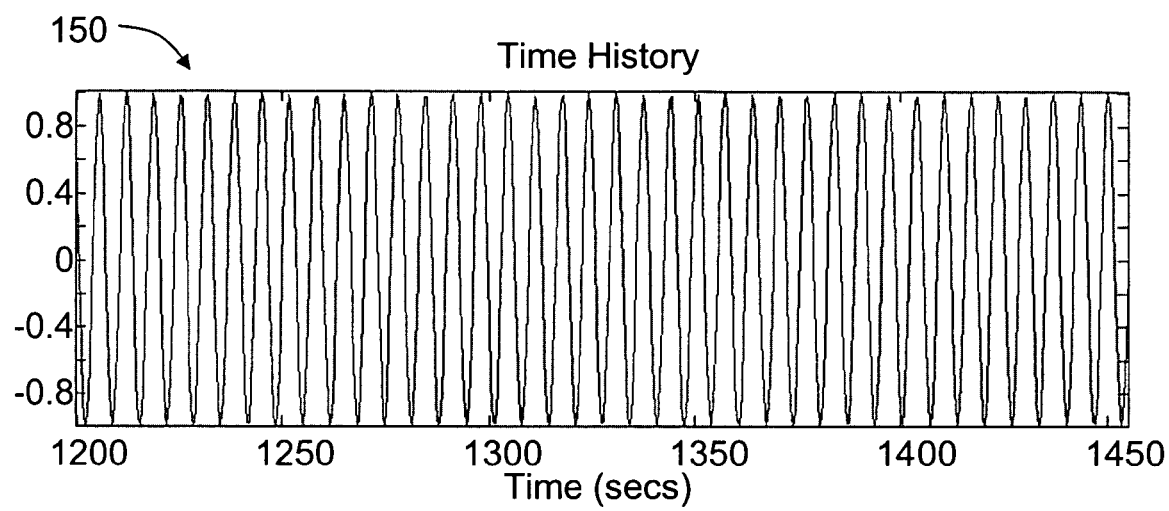
FIG. 8 is a graphical representation of an alternative exemplary input signal that may be used with the system of FIGS. 1 and 4.
Figure 8:
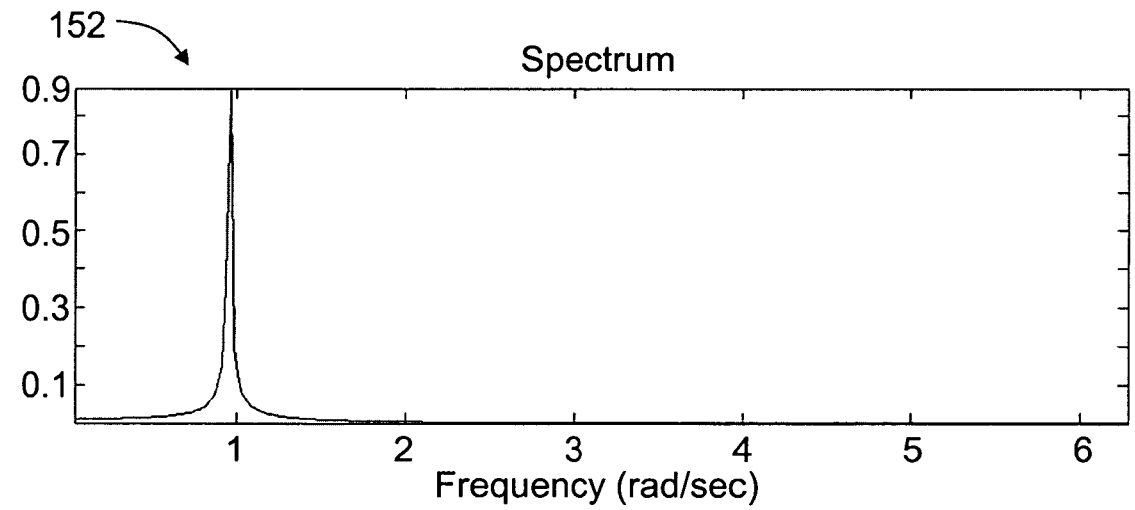
Figure 9:
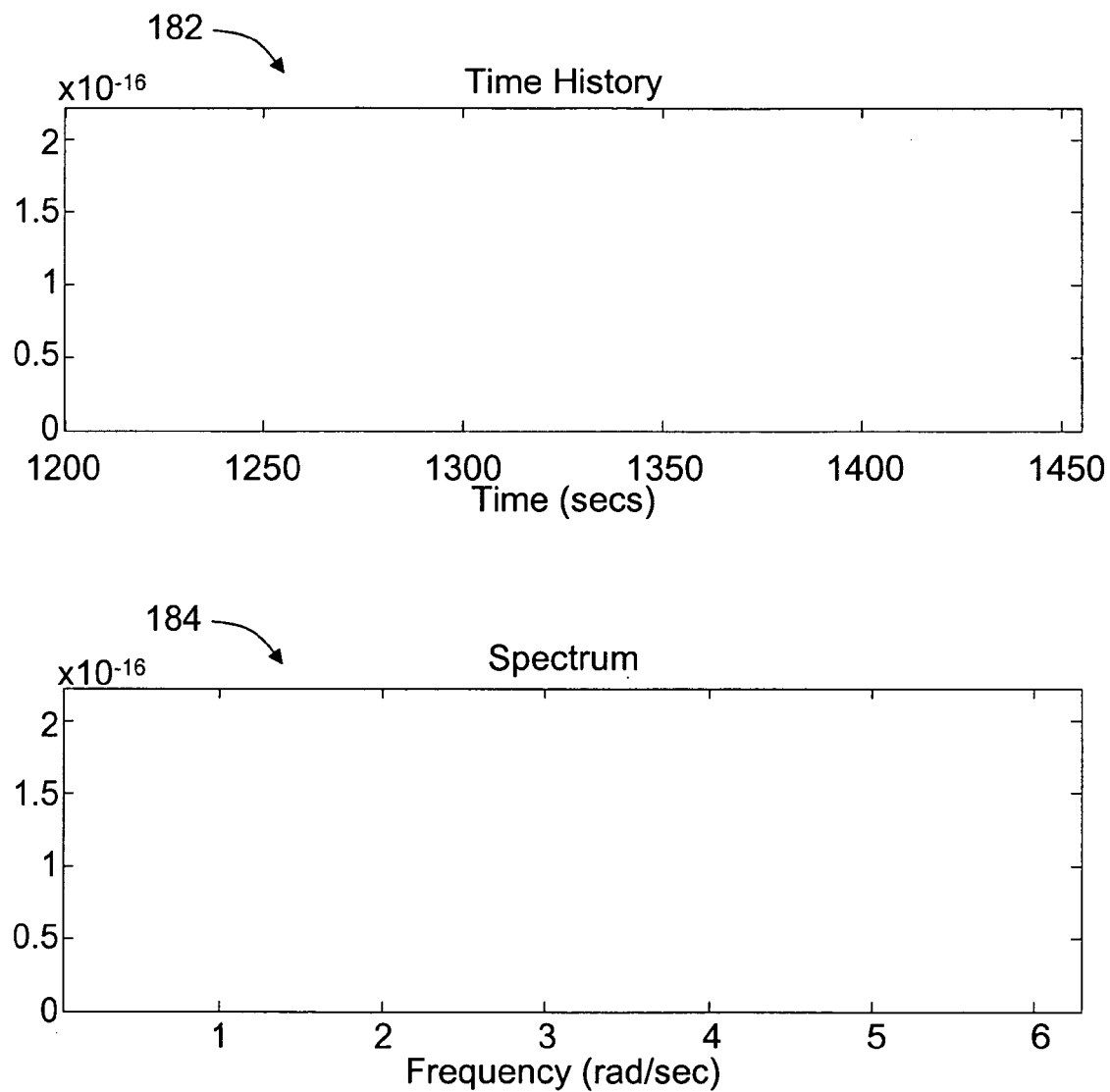
FIG. 9 is a graphical representation of an alternative exemplary noise signal that may be detected with the system of FIGS. 1 and 4.

Graphs 140 and 142 illustrate an exemplary input clock signal of interest 120 when switch 206 is connected to terminal 114, and graphs 172 and 174 represent an example of rotation noise signal 170 when switch 106 is connected to terminal 114. Graph 220, shown in FIG. 7 represents an exemplary of output complex rotation signal 206 in the time domain when switch 106 is connected to terminal 114, and graph 222 represents an exemplary output complex rotation signal 206 in the frequency domain when switch 106 is connected to terminal 114. In graph 220, the amplitudes of output complex rotation signal 206 are plotted on the y-axis and time t, measured in seconds, is plotted on the x-axis. In graph 220, the amplitudes of output complex rotation signal 206 are plotted on the y-axis and frequencies of signal 206, measured in radians/second, are plotted on the x-axis. In graph 222, an output rotation frequency of interest, which is evident as a major component in the graph, of output complex rotation signal 206 is 1 radian/second, which is the rotation frequency of rotator 92.

Figure 10:
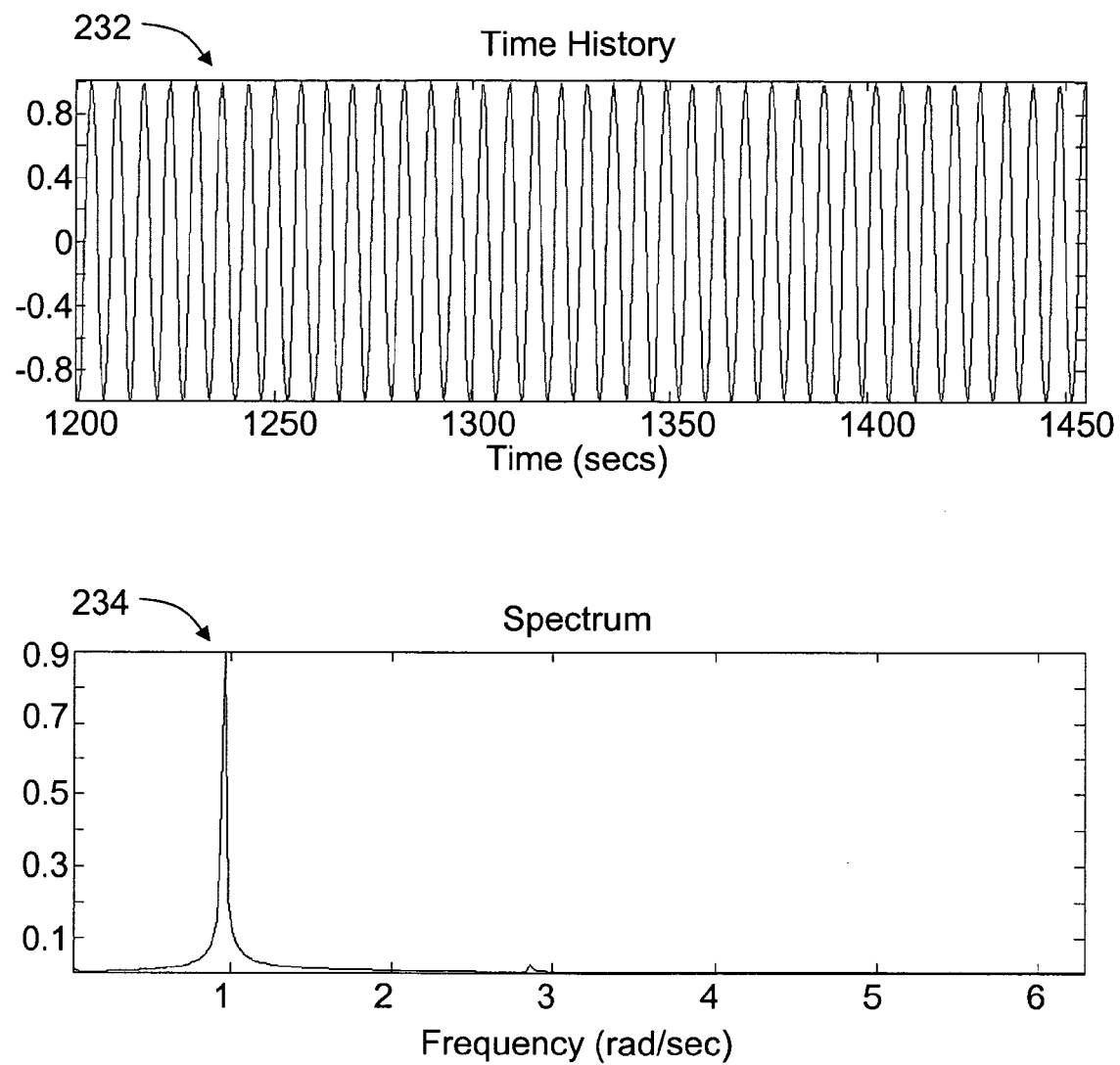
FIG. 10 is a graphical representation of an alternative exemplary output signal that may be used with the system of FIGS. 1 and 4.
Figure 11:
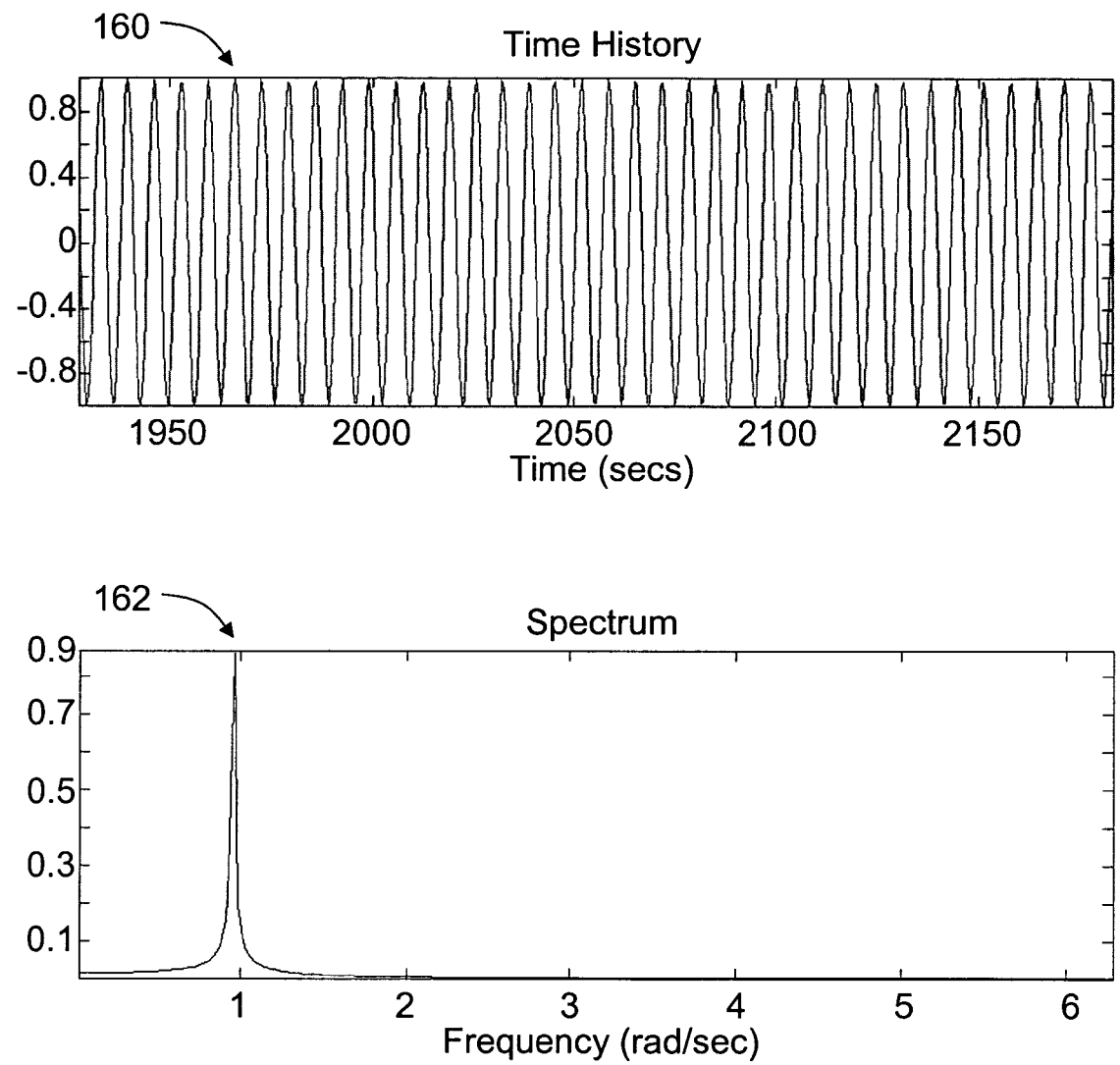
FIG. 11 is a graphical representation of a further exemplary input signal that may be used with the system of FIGS. 1 and 4.
Figure 12:
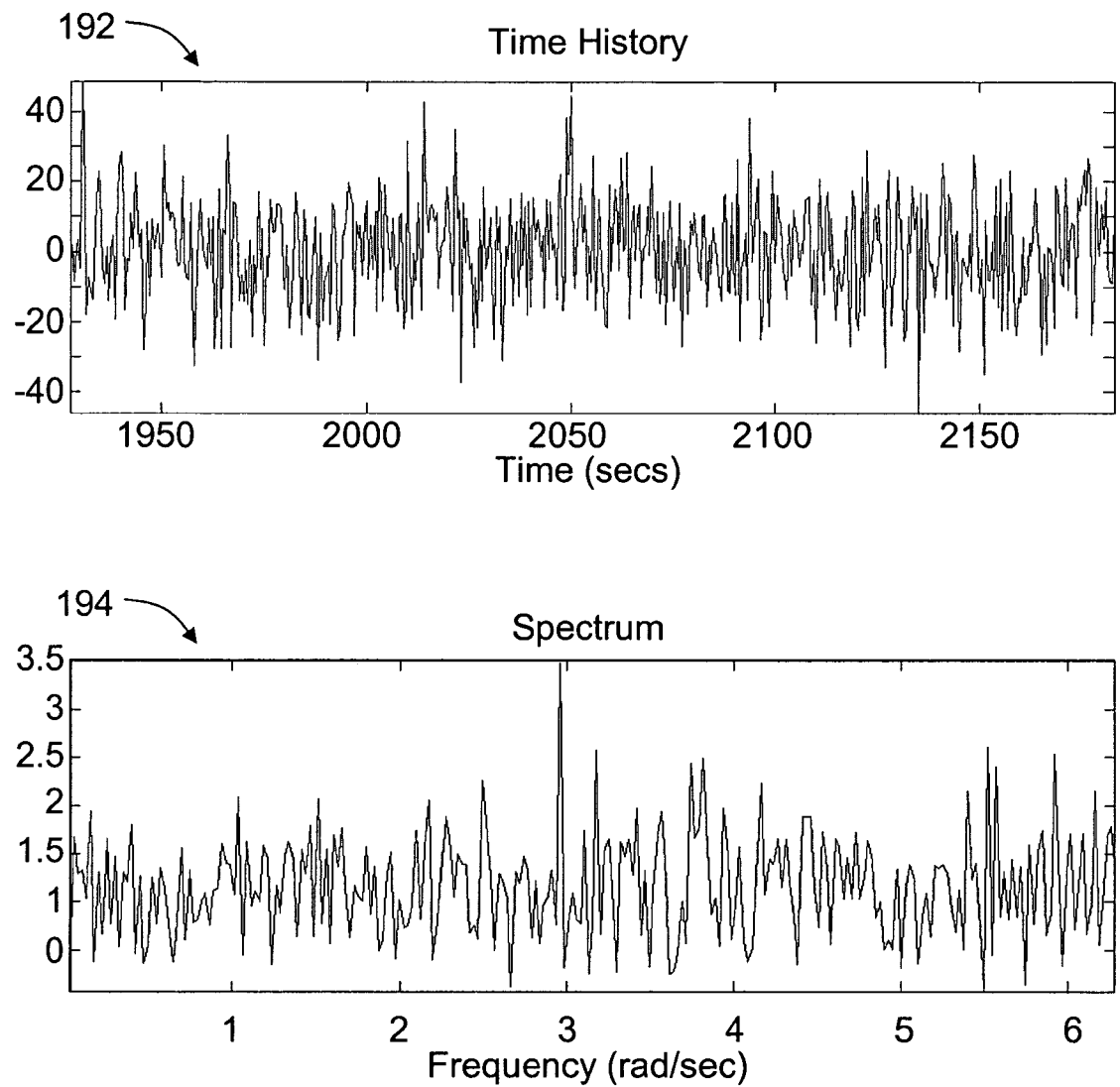
FIG. 12 is a graphical representation of a further exemplary noise signal that may be detected with the system of FIGS. 1 and 4.

When switch 104 is connected to terminal 110, multiplier 94 receives input signal 204 having an amplitude of zero and outputs multiplied rotation noise signal 200 having an amplitude of zero. When multiplied rotation noise signal 200 is received, adder 96 adds signal 200 and input clock signal of interest 120 to generate input complex rotation signal 202. Input complex rotation signal 202 is the same as input clock signal of interest 120 when multiplied rotation noise signal 200 has an amplitude of zero. When input complex rotation signal 202 is received, rotator 92 adjusts operating parameters to approximately equal the rotation frequency with an input frequency of interest of input clock signal of interest 120, and generates output complex rotation signal 206. Rotator 92 receives input complex rotation signal 202 when switch 106 is connected to terminal 112. Graphs 152 and 154 illustrate an example of an exemplary input clock signal of interest 120 when switch 104 is connected to terminal 110 and switch 106 is connected to terminal 112, and graphs 182 and 184 represent an example of an exemplary rotation noise signal 170 when switch 104 is connected to terminal 110 and switch 106 is connected to terminal 112. Graph 232 of FIG. 10 represents an example of an exemplary output complex rotation signal 206 in the time domain when switch 104 is connected to terminal 110 and switch 106 is connected to terminal 112, and a graph 234 represents an example of an exemplary signal 206 in the frequency domain when switch 104 is connected to terminal 110 and switch 106 is connected to terminal 112. In graph 232, the amplitudes of output complex rotation signal 206 are plotted on the y-axis and time t, measured in seconds, is plotted on the x-axis. In graph 234, the amplitudes of output complex rotation signal 206 are plotted on the y-axis and frequencies of signal 206, measured in radians/second, are plotted on the x-axis. In graph 234, an output rotation frequency of interest, which is evident as a major component in the graph, of output complex rotation signal 206 is approximately 0.95 radians/second.

Figure 13:
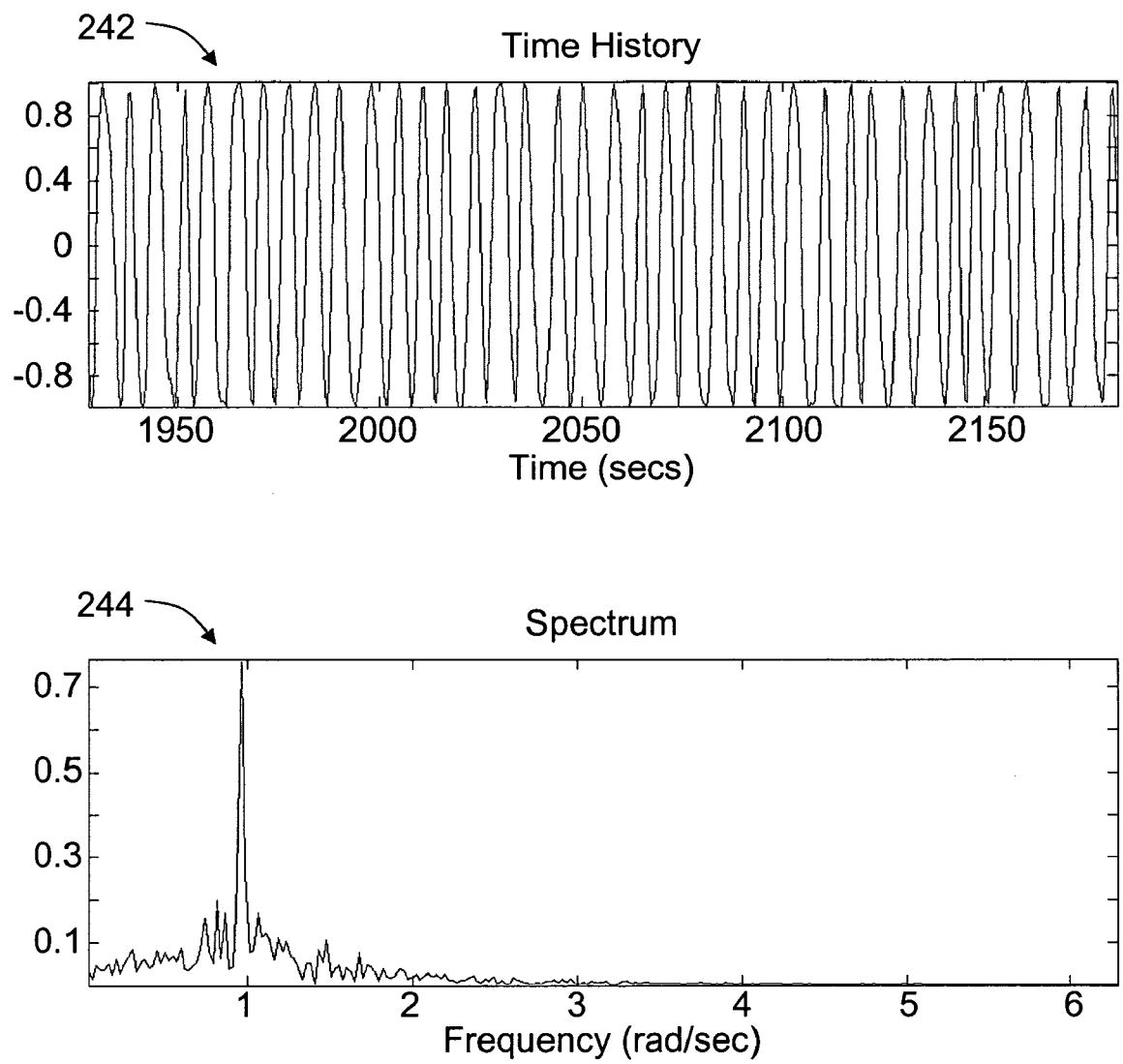
FIG. 13 is a graphical representation of a further exemplary output signal that may be used with the system of FIGS. 1 and 4.

When switch 104 is connected to terminal 108, multiplier 94 receives rotation noise signal 170 and multiplies signal 170 with the factor to generate multiplied rotation noise signal 200. Adder 96 adds multiplied rotation noise signal 200 to input clock signal of interest 120 and outputs input complex rotation signal 202. Rotator 92 receives input complex rotation signal 202, adjusts operating parameters of rotator 92 to approximately equal the rotation frequency with an input frequency of interest of input clock signal of interest 120, and generates output complex rotation signal 206. Rotator 92 receives input complex rotation signal 202 when switch 106 is connected to terminal 112. Graphs 160 and 162 illustrate an example of an exemplary input clock signal of interest 120 when switch 106 is connected to terminal 112 and switch 104 is connected to terminal 108, and graphs 192 and 194 illustrate an example of an exemplary rotation noise signal 170 when switch 106 is connected to terminal 112 and switch 104 is connected to terminal 108. Graph 242 of FIG. 13 illustrates an example of an exemplary output complex rotation signal 206 in the time domain when switch 106 is connected to terminal 112 and switch 104 is connected to terminal 108, and a graph 244 displays an example of an exemplary signal 206 in the frequency domain when switch 106 is connected to terminal 112 and switch 104 is connected to terminal 108. In graph 242, the amplitudes of output complex rotation signal 206 are plotted on the y-axis and time t, measured in seconds, is plotted on the x-axis. In graph 244, the amplitudes of output complex rotation signal 206 are plotted on the y-axis and frequencies of the output complex rotation signal, measured in radians/second, are plotted on the x-axis. In graph 244, an output rotation frequency of interest, which is evident as a major component in the graph, of output complex rotation signal 206 is approximately 0.95 radians/second.

Figure 14:
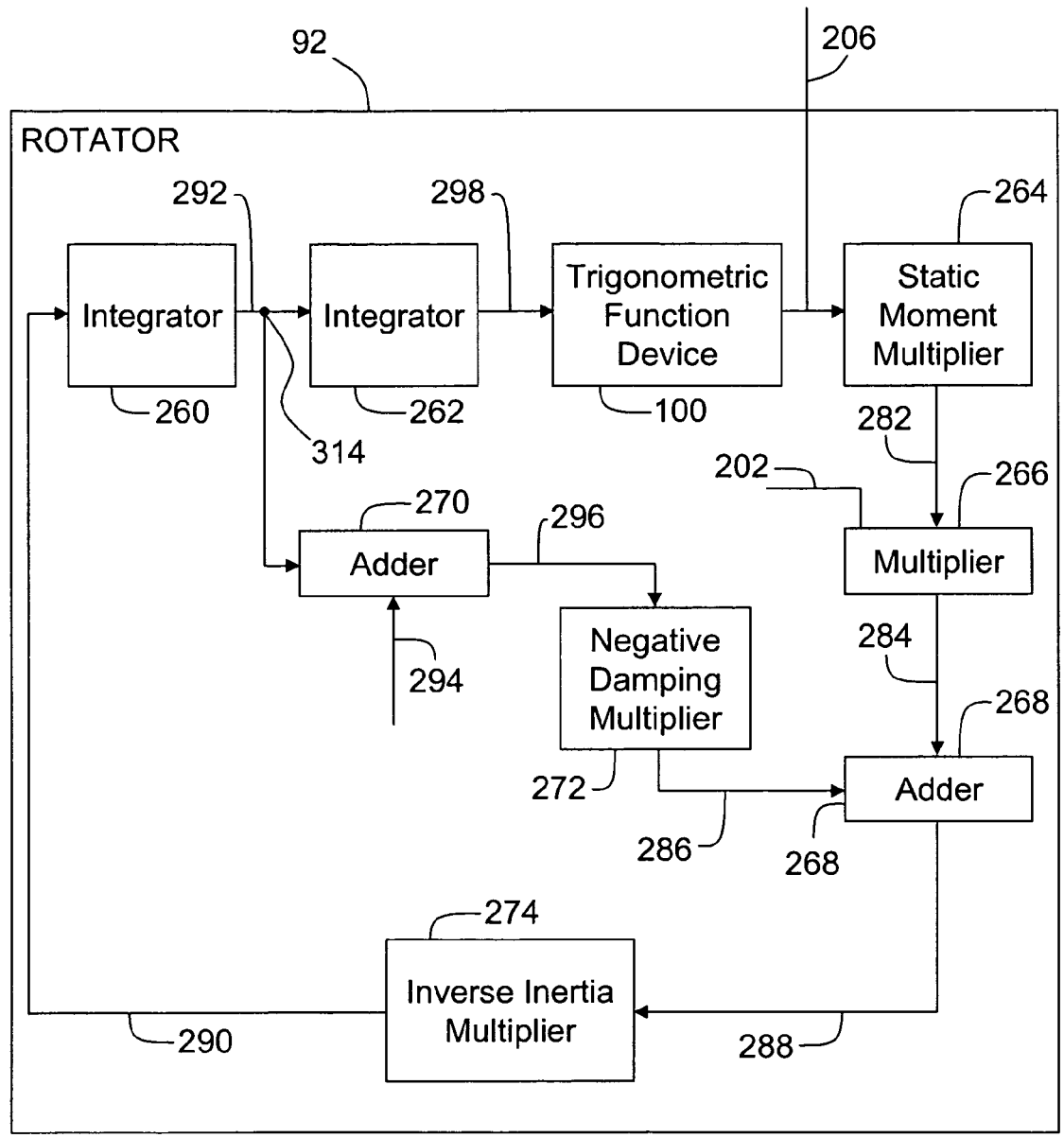
FIG. 14 is an exemplary embodiment of a rotator which may be used with the system shown in the FIG. 4.

FIG. 14 is an exemplary embodiment of rotator 92 that may be used with system 90 of FIG. 4. Rotator 92 includes a plurality of integrators 260 and 262, trigonometric function device 100, a static moment multiplier 264, a multiplier 266, a plurality of adders 268 and 270, a negative damping multiplier 272, and an inverse inertia multiplier 274. Each of adder 268 and multiplier 266 may represent a modulator. Each of static moment multiplier 264, negative damping multiplier 272, and inverse inertia multiplier 274 may include an amplifier.

When input complex rotation signal 202 is received, multiplier 266 multiplies signal 202 by a static moment multiplier output signal 282 to output a multiplier output signal 284. Adder 268 receives multiplier output signal 284 and a negative damping multiplier output signal 286, and adds signal 284 and signal 286 to generate an adder output signal 288. When adder output signal 288 is received, inverse inertia multiplier 274 multiplies signal 288 with an inverse 1/I of inertia I of rotator 92 to generate an inverse inertia multiplier output signal 290. Integrator 260 receives inverse inertia multiplier output signal 290, integrates signal 290 over time t to generate an integrator output signal 292. When integrator output signal 292 is received, adder 270 adds signal 292 to a negative value 294 of the rotation frequency f of rotator 92, and outputs an adder output signal 296. Negative damping multiplier 272 receives adder output signal 296, multiplies signal 296 by a negative value of a damping D of rotator 92, and generates negative damping multiplier output signal 286. When integrator output signal 292 is received, integrator 262 integrates signal 292 over time t to generate an integrator output signal 298. Trigonometric function device 100 receives integrator output signal 298 and executes the trigonometric function on signal 298 to generate output complex rotation signal 206. When output complex rotation signal 206 is received, static moment multiplier 264 multiplies signal 206 with a static moment w of rotator 92 to output static moment multiplier output signal 282.

In the exemplary embodiment, rotator 92 is represented by $$I*d(du/dt)/dt + D*(du/dt - f) = w*\sin(u)*\text{input complex rotation signal } 202 \quad (1)$$

wherein '*' represents multiplication, sin(u) is output complex rotation signal 206, d/dt represents a derivative with respect to time t, and u is an angular variable output, such as a rotation, of rotator 92. Operating parameters of rotator 92 include I, D, f, and w. An example of I=1, D=1, f=1, w=0.5. When an input frequency of interest of input clock signal of interest 120 is 0.95 radians/second, f is selected to be 1 radian/second, which is approximately equal to 0.95 radians/second. As another example, when an input frequency of interest of input clock signal of interest 120 is 0.95 radians/second, f is selected from a range between 0.90 radians/second and 1 radian/second and f is approximately equal to 0.95 radians/second. When input complex rotation signal 202 is received by rotator 92, the rotator adjusts operating parameters of the rotator so that the rotation frequency is approximately equal to an input frequency of interest of input clock signal of interest 120. When input complex rotation signal 202 is input signal 204 with an amplitude of zero, equation (1) becomes $$I*d(du/dt)/dt + D*(du/dt - f) = 0 \quad (2)$$

It is noted that a terminal 314 includes a switch that connects integrator output signal 292 to integrator 262 at one time t and connects integrator output signal 292 to adder 272 at another time t.

Figure 15:
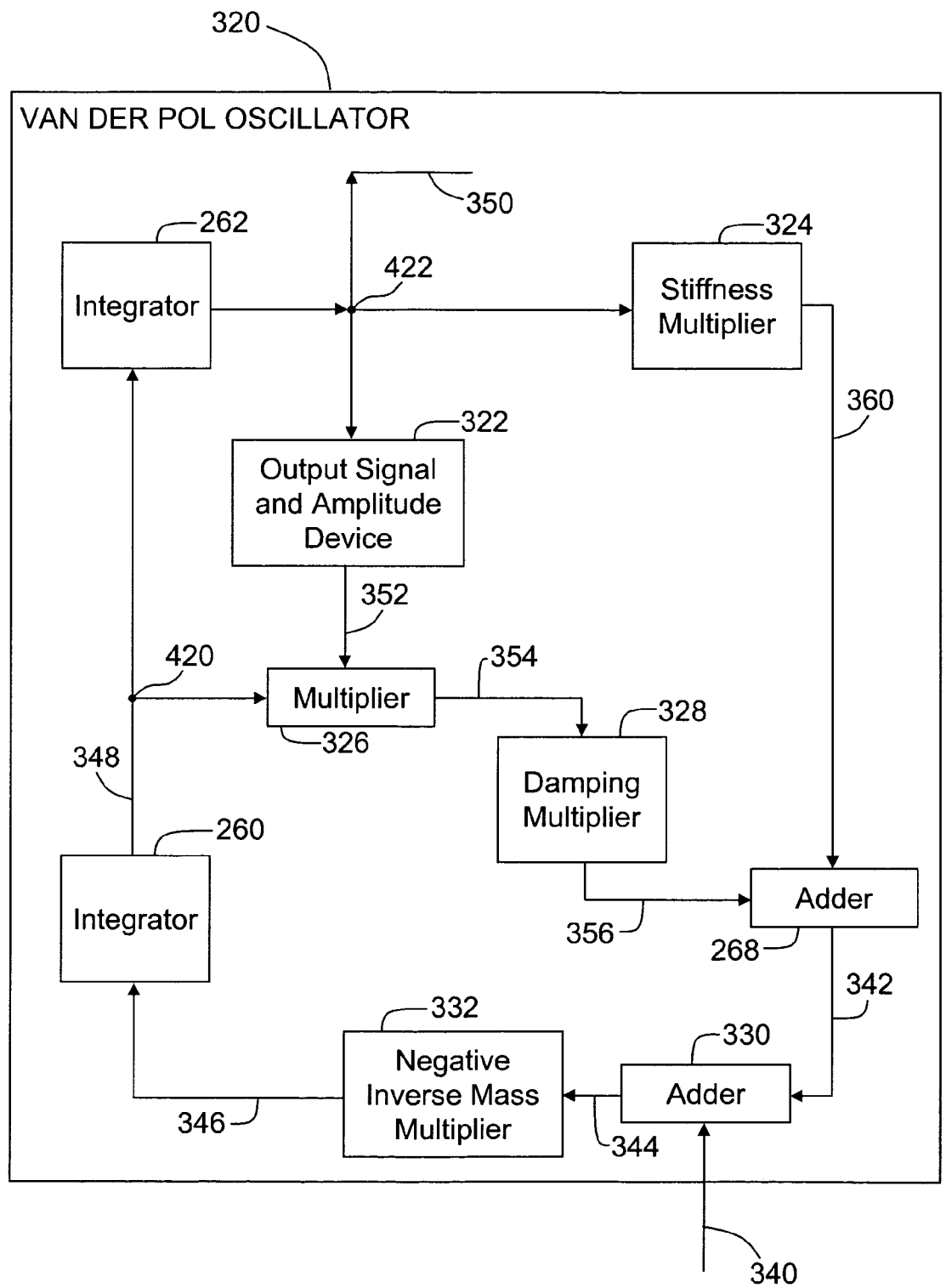
FIG. 15 is an exemplary embodiment of a Van der Pol oscillator.

FIG. 15 is an exemplary embodiment of an exemplary oscillator 320, known as a Van der Pol oscillator. Van der Pol oscillator 320 includes integrators 260 and 262, an output signal and amplitude device 322, a stiffness multiplier 324, a multiplier 326, a damping multiplier 328, adder 268, an adder 330, and a negative inverse mass multiplier 332. Each of stiffness multiplier 324, negative inverse mass multiplier 332, and damping multiplier 328 may represent an amplifier. Multiplier 326 may include a modulator.

When an input Van der Pol complex signal 340 and an adder output signal 342 are received, adder 330 adds signal 340 and signal 342 to generate an adder output signal 344. Negative inverse multiplier 332 receives adder output signal 344 and multiplies signal 344 with a negative value of an inverse (1/M) of a mass M of Van der Pol oscillator 340 to output a negative inverse mass multiplier signal 346. When negative inverse mass multiplier signal 346 is received, integrator 260 integrates signal 346 over time t to output an integrator output signal 348. Integrator 262 receives integrator output signal 348 and integrates signal 348 over time t to output an output Van der Pol complex signal 350. When output Van der Pol complex signal 350 is received, output signal and amplitude device 322 multiplies signal 350 by signal 350 raised to a power x to generate a first result, multiplies an amplitude A of signal 350 with the amplitude A raised to the power x to generate a second result, and subtracts the second result from the first result to output an output signal 352. It is noted that x is an integer.

Multiplier 326 receives output signal 352 and integrator output signal 348, and multiplies signal 352 with signal 348 to output a multiplier output signal 354. When multiplier output signal 354 is received, damping multiplier 328 multiplies signal 354 with a damping $D_v$ of Van der Pol oscillator 320 to generate a damping multiplier output signal 356. Stiffness multiplier 324 receives output Van der Pol complex signal 350 and multiplies signal 350 by a stiffness K of Van der Pol oscillator 320 to generate a stiffness multiplier output signal 360. When damping multiplier output signal 356 and stiffness multiplier output signal 360 are received, adder 268 adds signal 356 and signal 360 to generate adder output signal 342.

In the exemplary embodiment, Van der Pol oscillator 320 is represented by $$M*d(dv/dt)/dt-Dv*(0.25*A*A-v*v)*dv/dt+K*v=\text{input}$$
Van der Pol oscillator complex signal 340 (3)

where v is output Van der Pol complex signal 350, '*' represents multiplication, and d/dt represents a derivative with respect to time t. When input Van der Pol oscillator complex signal 340 has an amplitude of zero, equation (3) becomes $$M*d(dv/dt)/dt-Dv*(0.25*A*A-v*v)*dv/dt+K*v=0 \quad (4)$$

It is noted that a terminal 420 includes a switch that connects integrator output signal 348 to multiplier 326 at one time t and connects integrator output signal 348 to integrator 262 at another time t. It is also noted that a terminal 422 includes a switch that connects output Van der Pol complex signal 350 to stiffness multiplier 324 at one time t and connects signal 350 to output signal and amplitude device 322 at another time t.

Technical effects of the systems and methods for recovering a signal of interest from a complex signal include receiving input complex signal 28 in which the input noise signal cannot be distinguished from the input signal of interest, adjusting the oscillation frequency of oscillator 18 to approximately equal an input frequency of interest of signal 28, and outputting output complex signal 30. A display of output complex signal 30 shows the oscillation frequency that is approximately equal to an input frequency of interest of input complex signal 28. It is noted that an input frequency of interest of input complex signal 28 is the same as an input frequency of interest of the input signal of interest of signal 28. It is also noted that an input frequency of interest of input clock signal of interest 120 is the same as an input frequency of interest of input complex rotation signal 202.

While the invention has been described in terms of various specific embodiments, those skilled in the art will recognize that the invention can be practiced with modification within the spirit and scope of the claims.

What is claimed is:

1. A system for recovering a signal of interest from a complex signal, said system comprising at least one oscillator, wherein said at least one oscillator is configured to facilitate improving a signal-to-noise ratio of an input complex signal by adjusting an oscillation frequency of said at least one oscillator to be approximately equal to an input frequency of interest of the input complex signal, wherein said at least one oscillator is further configured to generate an output complex signal that has a higher signal-to-noise ratio than the input complex signal and that includes both an output signal of interest and an output noise signal based on a plurality of operating parameters of said at least one oscillator and of the input complex signal, said at least one oscillator comprises a static moment multiplier configured to:
receive the output complex signal; and
generate a static moment multiplier output signal.

2. A system in accordance with claim 1 wherein said at least one oscillator is other than a Van der Pol oscillator.

3. A system in accordance with claim 1 wherein said at least one oscillator is configured to oscillate with the oscillation frequency when a signal input to said at least one oscillator has an amplitude of zero.

4. A system in accordance with claim 1 wherein said at least one oscillator is configured to adjust the oscillation frequency by making a change to an operating parameter of said at least one oscillator.

5. A system in accordance with claim 1 further comprising a transform device configured to transform the output complex signal from a time domain into a frequency domain.

6. A system in accordance with claim 1 wherein the input complex signal includes an input signal of interest and an input noise signal, the input signal of interest is not distinguishable from the input noise signal, and the output signal of interest is distinguishable the output noise signal.

7. A system for recovering a signal of interest from a complex signal, said system comprises:
a signal transducer configured to convert a machine output signal having a first form to generate an analog sensed signal;
an analog-to-digital converter configured to convert the analog sensed signal to an input complex signal; and
at least one oscillator, wherein said at least one oscillator is configured to facilitate improving a signal-to-noise ratio of an input complex signal by adjusting an oscillation frequency of said at least one oscillator to be approximately equal to an input frequency of interest of the input complex signal, wherein said at least one oscillator is further configured to generate an output complex signal that has a higher signal-to-noise ratio than the input complex signal and that includes both an output signal of interest and an output noise signal based on a plurality of operating parameters of said at least one oscillator and of the input complex signal, said at least one oscillator comprises a static moment multiplier configured to:
receive the output complex signal; and
generate a static moment multiplier output signal.

8. A system in accordance with claim 7, wherein said at least one oscillator is other than a Van der Pol oscillator.

9. A system in accordance with claim 7 wherein said at least one oscillator includes one or more of a voltage controlled oscillator and a rotator.

10. A system in accordance with claim 7 wherein said at least one oscillator is configured to adjust the oscillation frequency by making a change to an operating parameter of said at least one oscillator.

11. A system in accordance with claim 7 further comprising a transform device configured to transform the output complex signal from a time domain into a frequency domain.

12. A system in accordance with claim 7 wherein the input complex signal includes an input signal of interest and an input noise signal, the input signal of interest is not distinguishable from the input noise signal, and the output signal of interest is distinguishable the output noise signal.

13. A method for recovering a signal of interest from a complex signal, said method comprises:
receiving an input complex signal; and
improving, by at least one oscillator, a signal-to-noise ratio of the input complex signal, wherein said improving the signal-to-noise ratio is performed by adjusting an oscillation frequency of the at least one oscillator to be approximately equal to an input frequency of interest of the input complex signal, wherein the at least one oscillator is further configured to generate an output complex signal that has a higher signal-to-noise ratio than the input complex signal and that includes both an output signal of interest and an output noise signal based on a plurality of operating parameters of the at least one oscillator and of the input complex signal, wherein the at least one oscillator includes a static moment multiplier configured to:
receive the output complex signal; and
generate a static moment multiplier output signal.

14. A method in accordance with claim 13 further comprising oscillating the at least one oscillator with the oscillation frequency when a signal input to the at least one oscillator has an amplitude of zero.

15. A method in accordance with claim 13 wherein said adjusting the oscillation frequency is performed by making a change to an operating parameter of the at least one oscillator.

16. A method in accordance with claim 13 further comprising transforming the output complex signal from a time domain into a frequency domain.

17. A method in accordance with claim 13 wherein improving the signal-to-noise ratio of the input complex signal further comprises improving the signal-to-noise ratio using at least one oscillator that is other than a Van der Pol oscillator.

* * * * *